(12) United States Patent
Doree et al.

(10) Patent No.: US 11,824,669 B2
(45) Date of Patent: Nov. 21, 2023

(54) METHOD OF MEDIA STATE SYNCHRONIZATION

(71) Applicant: Orange, Paris (FR)

(72) Inventors: José Doree, Châtillon (FR); Jean-Claude Le Rouzic, Châtillon (FR)

(73) Assignee: ORANGE, Issy-les-Moulineaux (FR)

( * ) Notice: Subject to any disclaimer, the term of this patent is extended or adjusted under 35 U.S.C. 154(b) by 16 days.

(21) Appl. No.: 16/626,114

(22) PCT Filed: Jun. 21, 2018

(86) PCT No.: PCT/FR2018/051504
§ 371 (c)(1),
(2) Date: Dec. 23, 2019

(87) PCT Pub. No.: WO2019/002730
PCT Pub. Date: Jan. 3, 2019

(65) Prior Publication Data
US 2020/0220739 A1    Jul. 9, 2020

(30) Foreign Application Priority Data
Jun. 26, 2017  (FR) ...................... 1755824

(51) Int. Cl.
*H04L 12/14*      (2006.01)
*H04L 65/1016*   (2022.01)
*H04L 65/1063*   (2022.01)

(52) U.S. Cl.
CPC ...... *H04L 12/1407* (2013.01); *H04L 65/1016* (2013.01); *H04L 65/1063* (2013.01)

(58) Field of Classification Search
CPC ............. H04L 12/1407; H04L 65/1016; H04L 65/1063

(Continued)

(56) References Cited

U.S. PATENT DOCUMENTS

| 9,009,293 B2* | 4/2015 | Batz ...................... H04W 28/10 709/224 |
| 9,973,966 B2* | 5/2018 | Karampatsis ..... H04W 72/1242 |

(Continued)

FOREIGN PATENT DOCUMENTS

| CN | 107800543 A | * | 3/2018 |
| WO | WO 2015/181505 | | 12/2015 |

OTHER PUBLICATIONS

3rd Generation Partnership Project; Technical Specification Group Core Network and Terminals; Policy and Charging Control over Rx reference point (Release 14), 3GPP Standard; 3GPP TS 29.214, 3rd Generation Partnership Project (3GPP), (Year: 2016).*

(Continued)

*Primary Examiner* — Cheikh T Ndiaye
*Assistant Examiner* — Ayele F Woldemariam
(74) *Attorney, Agent, or Firm* — Knobbe, Martens, Olson & Bear, LLP

(57) ABSTRACT

A method of media state synchronization is described. An applicative entity sends a request to a rules control entity asking the rules control entity to dispatch a message to the applicative entity describing the state of the media controlled by this applicative entity and currently being used. On expiry of a default deadline or one contained in the request, the rules control entity sends the applicative entity a message in which the rules control entity describes the state of the media. Subsequent to the receipt of the message, the applicative entity does not undertake any action if the media list provided by the rules control entity is identical to that known to the applicative entity, or corrects its state of the media if a subset of the media of the list is different from the list of media known to the applicative entity, or requests the freeing of the session if the set of the media of the list is different from the list of media known to the applicative (Continued)

Figure 1:
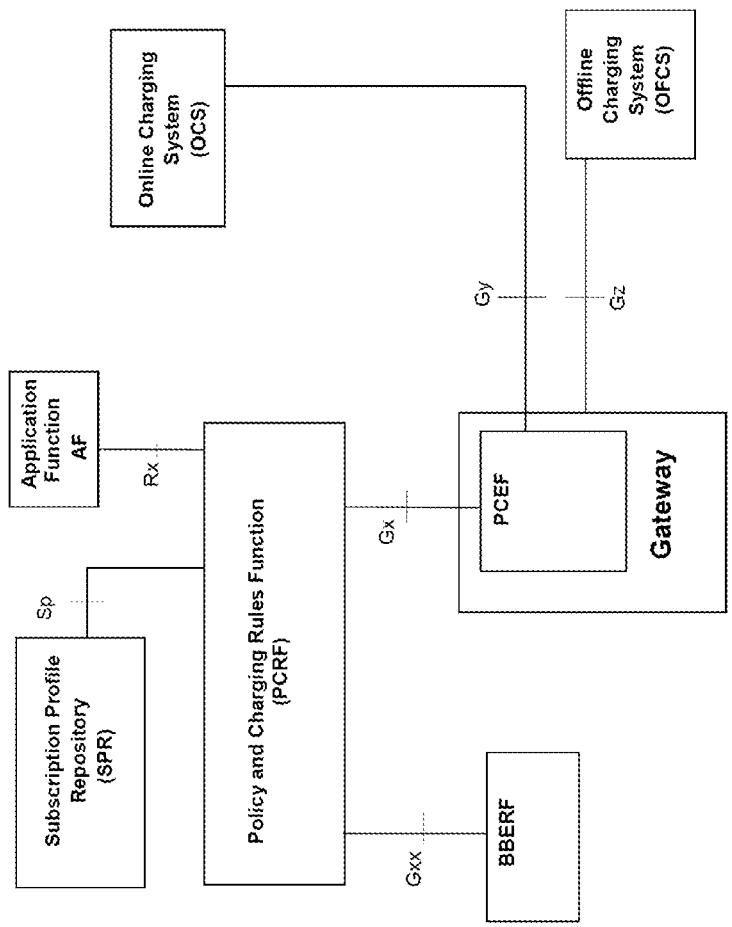

entity or if the session itself is unknown to the applicative entity.

14 Claims, 2 Drawing Sheets

(58) Field of Classification Search
USPC .......................................................... 709/223
See application file for complete search history.

(56) References Cited

U.S. PATENT DOCUMENTS

| | | | |
|---|---|---|---|
| 10,778,589 B2* | 9/2020 | Arora | ....................... H04W 4/70 |
| 2008/0271113 A1* | 10/2008 | Belling | ................... H04L 63/10 |
| | | | 726/1 |
| 2009/0144359 A1* | 6/2009 | Karlsen | ................... H04L 67/26 |
| | | | 709/203 |
| 2012/0084425 A1* | 4/2012 | Riley | ................... H04M 15/765 |
| | | | 709/223 |
| 2015/0245239 A1* | 8/2015 | Tan | ....................... H04L 45/745 |
| | | | 370/329 |

OTHER PUBLICATIONS

International Search Report and Written Opinion dated Aug. 29, 2018 for Application No. PCT/FR2018/051504.

"3rd Generation Partnership Project; 12, 13 Technical Specification Group Core Network and Terminals; Policy and Charging Control over Rx reference point (Release 14)", 3GPP Standard; 3GPP TS 29.214, $3^{rd}$ Generation Partnership Project (3GPP), Mobile Competence Centre; 650, Route Des Lucio Les; F-06921 Sophia-Antipolis Cedex; France, vol. CT WG3, No. VI4.2.0, Dec. 19, 2016 (Dec. 19, 2016), pp. 1-77.

* cited by examiner

METHOD OF MEDIA STATE SYNCHRONIZATION

RELATED APPLICATIONS

This application is the U.S. National Phase of Application No. PCT/FR2018/051504 entitled "METHOD OF MEDIA STATE SYNCHRONIZATION" and filed Jun. 21, 2018, which claims the benefit of French Patent Application No. 1755824, filed Jun. 26, 2017, each of which is incorporated by reference in its entirety.

The present invention relates to communications networks of IP ("Internet Protocol") type, and notably those IP networks which are able to implement evolved session control protocols. IP networks allow the circulation of conversational data, within the framework of services such as "Voice over IP" (VoIP), "Content Sharing", or "Instant Messaging".

More particularly, the present invention relates to the means put in place in an IP network to ensure the consistency of the state of the media resources with the entities responsible for reserving these resources.

Conventional evolved session control protocols, such as the SIP protocol (initials standing for "Session Initiation Protocol"), use so-called "signaling" messages, which are messages allowing a terminal to request a connection with another terminal, or also messages signaling that a telephone line is occupied, or signaling that the called telephone is ringing, or else signaling that such telephone is connected to the network and can be reached in this or that way.

The SIP protocol was defined by the IETF (Internet Engineering Task Force) in document RFC 3261. This protocol allows the establishment, modification and termination of multimedia sessions in a network using the IP protocol. The SIP protocol was thereafter extended notably in document RFC 3265. This extension defines events notification procedures.

The SIP protocol is used in particular in infrastructures of IMS type (initials standing for "IP Multimedia Subsystem"). IMS was defined by the 3GPP ("Third Generation Partnership Project") standardization organization and TISPAN ("Telecommunications and Internet Converged Services and Protocols for Advanced Networking"). It is a network architecture introduced by the 3GPP for mobile networks, and then taken up by TISPAN for fixed networks. This architecture allows the dynamic establishment and the control of multimedia sessions between two users as well as the reservation of the resources at the multimedia streams transport network level. By virtue of this architecture, network operators can conveniently implement a management policy, provide a predetermined Quality of Service, and calculate the amounts to be billed to users. IMS currently makes it possible to access services of telephone, videophone, Presence and Instant Messaging type, whose interaction it also manages.

When therefore a user wishes to benefit from the services offered by an IMS network, he sends signaling messages to the network that may include notably diverse types of requests.

Firstly, the user's user equipment must, save for exceptions (such as certain emergency calls), register on the network. When the network is incapable of making the link connecting this registration and a previous registration (for example subsequent to a network fault, or subsequent to a shutdown of the user equipment for a duration greater than a predetermined value), the registration is considered to be an initial registration. After an initial registration, the user's user equipment must periodically send a request to the network to confirm that he wishes to maintain his registration.

To be able to register the user equipments, IMS networks comprise one or more registration servers, called "S-CSCF" (initials standing for "Serving-Call Server Control Function"), able (among other functions) to manage the registration procedure in respect of the devices connected to the network.

IMS networks furthermore comprise one or more interrogation servers, called "I-CSCF" (initials standing for "Interrogating-Call Server Control Function")—otherwise often combined physically with the S-CSCF registration servers to constitute call servers denoted "I/S-CSCF"—which, at the moment of registration of a user equipment, interrogate a subscriber data server called "HSS" (initials standing for "Home Subscriber Server"), so as to be able to select an S-CSCF server possessing the characteristics which are necessarily (and, if relevant, optionally) required in order to attain the service level subscribed to by the user. The HSS servers each contain a database of users, and are therefore the equivalent in IP networks of the "HLR" servers (initials standing for "Home Location Register") used in GSM networks. Each HSS server contains the "profile" of a certain number of user equipments of the network, this profile comprising their registration state, authentication data and location data, and the services to which it is entitled.

Indeed, after an S-CSCF server has thus been allocated thereto, each user can make use of a certain number of services during the session in progress. It may for example entail services offered automatically to all the users of the IMS network. It can also entail services to which this user has subscribed with the operator of the network, and which are placed at his disposal automatically. Finally, it may entail services which the user can make use of after having sent an appropriate request (SIP SUBSCRIBE).

These services comprise audiovisual applications such as mentioned hereinabove. It can also entail a subscription to the state of a resource, in which case event notifications (SIP NOTIFY) are sent to the user equipment when the state of the resource changes; for example, when the user of a user equipment has a voice box on the network, he will be able to be informed whenever a message has been recorded on this voice box; a user can, likewise, ask to be notified of the registration state of his own user equipment.

IMS networks furthermore comprise one or more servers called "P-CSCF" (initials standing for "Proxy-Call Server Control Function"). For each user equipment connected to an IMS network, there exists a P-CSCF server serving as entity for hooking up between the IMS core network and the access network used by this user equipment; thus, all the SIP signaling exchanged between the user equipment on the one hand, and the I-CSCF interrogation server or the S-CSCF registration server on the other hand, passes through the P-CSCF server.

To implement the charging of users, IMS networks use an architecture called PCC (initials standing for "Policy and Charging Control"). This PCC architecture is also used in packet switching mobile networks comprising a core network EPC (initials standing for "Evolved Packet Core"), as described in the 3GPP document TS 23.203. The EPC architecture is illustrated in FIG. 1, which is adapted from FIG. 5.1.1 of said document TS 23.203.

This PCC architecture comprises notably a rules control entity called PCRF (initials standing for "Policy Control and Charging Rules Function"), which provides operator policy and charging rules (such as for example the maximum allotted bitrate, or the priority of a stream according to its type) to a rules application entity PCEF (initials standing for "Policy and Charging Enforcement Function").

The rules control entity PCRF is able to determine the charging scheme for a given service stream; it has access to the user's subscription data so as to be able to adapt the use made by this service of the transport resources, as well as the charging of the service, as a function of the user's profile. The rules control entity PCRF collects from several sources information related to the networks (such as the type of radio access, the addresses of gateways, or the location of the user's terminal), information related to the user's subscription, and information related to the applications used by the user on his terminal (such as the type of application, or the type of media). The control entity PCRF has access to the subscription information of the user of the terminal, which is stored in a database called SPR (initials standing for "Subscription Profile Repository"), so as to be able to adapt the assignment of the transport resources by the service concerned as well as the charging of the service as a function of the profile of the user of the terminal.

The PCEF entity, for its part, selects a rule PCC for each data packet of said stream by examining the service data contained in this packet. The PCEF function is implemented at the level of a gateway for access to the core network. 3GPP document TS 29.212 (entitled "Policy and Charging Control over Gx reference point") defines the interface "Gx" between the control entity PCRF and the rules application entity PCEF. Upon the opening of a communication session, the rules application entity PCEF opens a command session relating to the session for communication with the rules control entity PCRF and communicates to it information associated with this communication session (for example the type of radio access, the service quality parameters requested, or the bandwidth requested). As a function of these characteristics and of other information originating from several other sources, the control entity PCRF determines the initial policy (quality of service, tariffs to be put in place, authorization of access) to be applied for the various services carried by the communication session in progress. This policy can be modified as a function of events occurring during the communication session.

An application entity AF (initials standing for "Application Function") communicates with the rules control entity PCRF (or an agent entity) so as to transmit dynamic session information and to receive notifications, for example relating to the occurrence of events. 3GPP document TS 29.214 (entitled "Policy and Charging Control over Rx reference point") defines the interface "Rx" between the rules control entity PCRF and the application entity AF. Upon the opening of a communication session, the application entity AF makes a request for media resources from the PCRF entity.

The P-CSCF server of an IMS network, mentioned hereinabove, is a conventional example of application entity AF.

Finally, the entity BBERF (initials standing for "Bearer Binding and Event Reporting Function") enables the rules control entity PCRF to have useful information in respect of control and supervision of wireless local access networks WLAN.

By virtue of these diverse entities, the PCC architecture is able to generate CDRs (initials standing for "Call Detail Record"). More precisely, an entity OCS (initials standing for "Online Charging System") generates CDRs on the fly, while an entity OFCS (initials standing for "Offline Charging System") generates a file comprising a set of CDRs that the operator of the network recovers periodically (for example, every hour or every day).

It will be noted that all the interfaces of the PCC architecture (except for the interface with the SPR database) implement the DIAMETER base protocol described in IETF document RFC 3588.

Upon the request for resources of the application entity AF, the latter communicates, through the interface Rx mentioned hereinabove, the characteristics of the desired resources. These resources are essentially a set of "media" (for example an "audio" stream and a "video" stream) possessing certain properties desired by a user of the network. The information relating to a media thus takes the form:

```
Media-Component-Description ::= < AVP Header: 517 >
    { Media-Component-Number} ; Ordinal number of the media comp.
    *[ Media-Sub-Component ] ; Set of flows for one flow identifier
    [ AF-Application-Identifier ]
    [ Media-Type ]
    [ Max-Requested-Bandwidth-UL ]
    [ Max-Requested-Bandwidth-DL ]
    [ Max-Supported-Bandwidth-UL ]
    [ Max-Supported-Bandwidth-DL ]
    [ Min-Desired-Bandwidth-UL ]
    [ Min-Desired-Bandwidth-DL ]
    [ Min-Requested-Bandwidth-UL ]
    [ Min-Requested-Bandwidth-DL ]
    [ Flow-Status ]
    [ Priority-Sharing-Indicator ]
    [ Reservation-Priority ]
    [ RS-Bandwidth ]
    [ RR-Bandwidth ]
    *[ Codec-Data ]
    [ Sharing-Key-DL ]
    [ Sharing-Key-UL ]
    [ Content-Version ]
    *[ AVP ]
```

Each of the media is identified by a number called "Media-Component-Number", as well as by diverse characteristics (bitrate, type of media, addresses, and so on and so forth).

It is important that the current state of these media components be known identically on the application entity AF and on the rules control entity PCRF: indeed, a component known on the rules control entity PCRF and unknown on the application entity AF constitutes an anomaly (an "orphan"), that must be detected and removed since it results in needless consumption of resources—and ultimately to saturation of the resources of the PCRF if there are only orphans.

However, subsequent to various network events, the formation of orphans is possible in certain circumstances. By way of example, if the link between the application entity AF and the rules control entity PCRF is lost for a certain span of time, events may have led to the release of resources by the rules control entity PCRF without it being possible for the application entity AF to have any knowledge thereof, for example because of a loss of connectivity in a radio access network RAN. According to another example, if the application entity AF has had to be totally or partly reinitialized, it might have lost the precise knowledge of the media currently in use. The same holds if the application entity AF has been replaced, for example subsequent to the implementation of geographical redundancy. The same problem arises in the TISPAN (Telecommunications and Internet converged Services and Protocols for Advanced Networking) fixed networks complying with the standard TS 183 017 of the ETSI (European Telecommunications Standards Institute).

The present invention therefore relates, according to a first aspect, to a method of media state synchronization, comprising the following steps:

an application entity sends a request to a rules control entity asking said rules control entity to send a message to said application entity describing the state of the media controlled by this application entity and currently in use, on expiry of a default time period or one contained in said request, the rules control entity sends the application entity a message in which the rules control entity describes the state of said media, and subsequent to the receipt of said message, the application entity does not undertake any action if the media list provided by the rules control entity is identical to the media list known to the application entity, or corrects its state of said media if a subset of the media of the list is different from the media list known to the application entity, or requests the release of the session if the set of the media of the list is different from the media list known to the application entity or if the session itself is unknown to the application entity.

It will be noted that the invention applies to any network using a media stream reservation protocol, notably networks of IMS and EPC type.

By virtue of these arrangements, an operator of said network allows the application entity and the rules control entity to resynchronize mutually, under chosen deadlines.

According to particular characteristics, the application entity furthermore indicates to the rules control entity a period on expiry of which the application entity wishes to receive said messages describing the state of said media.

By virtue of these arrangements, the application entity can indicate to the rules control entity the desired periodicity for the notifications of the state of said media in the case where this periodicity has not been preconfigured in the rules control entity.

According to other particular characteristics, said request is presented by said application entity upon a request for media resources to said rules control entity.

By virtue of these arrangements, the signaling between the application entity and the rules control entity is reduced to the minimum.

According to yet other particular characteristics, the exchanges between the application entity and the rules control entity comply with the Diameter protocol.

By virtue of these arrangements, the signaling protocol conventionally implemented in the PCC architecture is used.

According to a second aspect, the invention relates to diverse devices.

It thus relates, firstly, to an application entity comprising means for:

sending toward a rules control entity a request asking said rules control entity to send a message to said application entity describing the state of the media controlled by this application entity and currently in use, receiving a message in which the rules control entity describes the state of said media, and subsequent to the receipt of said message, not undertaking any action if the media list provided by the rules control entity is identical to the media list known to the application entity, or correcting its state of said media if a subset of the media of the list is different from the media list known to the application entity, or requesting the release of the session if the set of the media of the list is different from the media list known to the application entity or if the session itself is unknown to the application entity.

According to particular characteristics, said application entity furthermore comprises means for indicating to said rules control entity a period on expiry of which the application entity wishes to receive said messages describing the state of said media.

According to other particular characteristics, said application entity furthermore comprises means for implementing the Diameter protocol.

The invention also relates, secondly, to a rules control entity comprising means for:

receiving from an application entity a request asking said rules control entity to send a message to said application entity describing the state of the media controlled by this application entity and currently in use, and on expiry of a default time period or one contained in said request, sending the application entity a message in which the rules control entity describes the state of said media.

According to particular characteristics, said rules control entity furthermore comprises means for implementing the Diameter protocol.

The advantages offered by these devices are essentially the same as those offered by the correlative methods succinctly set forth hereinabove.

It will be noted that it is possible to embody these devices in the context of software instructions and/or in the context of electronic circuits.

According to a third aspect, the invention relates to a communication system comprising at least one application entity and at least one rules control entity such as are described succinctly hereinabove.

The invention also envisages a computer program downloadable from a communication network and/or stored on a support readable by computer and/or executable by a microprocessor. This computer program is noteworthy in that it comprises instructions for the execution of the steps of the method of synchronization which is succinctly set forth hereinabove, when it is executed on a computer.

The advantages offered by this computer program are essentially the same as those offered by said method.

Figure 2:
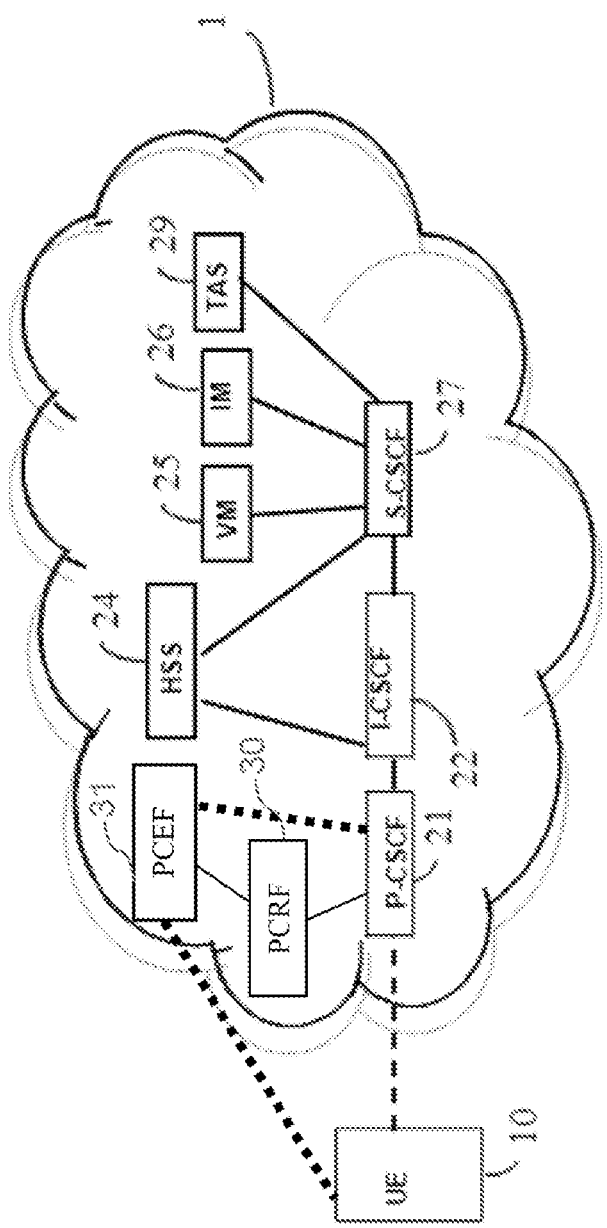

Other aspects and advantages of the invention will become apparent on reading the description detailed hereinbelow of particular embodiments which are given by way of nonlimiting examples. The description refers to the figures which accompany it and in which:

FIG. 1, described hereinabove, represents a conventional PCC architecture, and FIG. 2 schematically represents a system for the provision of multimedia services which is able to implement the invention.

Although the present invention relates to any IP network making use of the DIAMETER protocol, a network architecture of IMS type, such as presented succinctly hereinabove, will now be considered by way of exemplary embodiment. This architecture is illustrated in FIG. 2.

The multimedia services offered by this IMS network 1 can comprise services in respect of telephony, video-telephony, content sharing, Presence, Instant Messaging, or television. These services are at the disposal of the user of a user equipment (or UE) 10 belonging to the network 1, which allows the user equipment 10 to exchange multimedia streams and session control signals conforming to the SIP protocol, for example with the user equipment (not represented) of a user belonging to an SIP network (not represented) linked to the network 1.

The user equipment 10 can be a fixed or mobile terminal, or a domestic or company gateway, having signaling means SIP and being able to comprise audiovisual content playback means.

As shown by FIG. 2, this IMS network 1 comprises, in addition to an IP transport infrastructure (not represented):

- at least one S-CSCF server; the S-CSCF server 27 manages notably the registration procedure in respect of the devices connected to the network 1; the S-CSCF server 27 also manages the routing of the signaling between the user equipment 10 and the servers for voice messaging VM 25, for Instant Messaging 26, and for telephony TAS 29;
- at least one I-CSCF server; the I-CSCF server 22 manages notably the routing toward other terminals managed by the same IMS network 1 and the routing of the signaling between this IMS network 1 and other networks (not represented);
- at least one P-CSCF server; the P-CSCF server 21 serves as entity for hooking up between the IMS core network and the access network used by the user equipment 10;
- at least one database server, of HSS type; the HSS server 24 contains the profile of the user of the user equipment 10 in terms of authentication and location data, and of subscribed services;
- at least one server VM 25 for message-summary; the server VM 25 manages the subscription of the user equipment 10 to the events of posting/consultation of the messages intended for the user equipment 10, and notifies the user equipment 10 upon the occurrence of these events;
- at least one Instant Messaging server IM 26; in case of subscription of the user of the UE 10 to the Instant Messaging service, this user can dialog "instantly" on-line with other subscribers to this service; and
- at least one telephone server TAS 29; the server TAS manages the telephone services to which the user of the terminal 10 has subscribed via his operator, such as number presentation or call return.

The message summary server VM 25, Instant Messaging server IM 26, and telephone server TAS 29 are examples of Applications Servers (AS).

Certain services, such as those of the server VM 25 and of the Instant Messaging server IM 26, rely on the subscription of the terminal 10 to predetermined events, as is explained hereinabove.

In FIG. 2, the dotted lines represent the real path followed by the SIP signals (between the UE 10 and the PCEF entity 31, and then between the PCEF entity 31 and the P-CSCF server 21). The hatched line (between the UE 10 and the P-CSCF server 21) represents the "logical" path of the SIP signaling. The PCRF entity 30 is connected to the PCEF entity 31 and to the P-CSCF server 21. Here, the P-CSCF server 21 plays the role of application entity AF according to the PCC architecture.

In a known manner, this architecture can implement the following steps.

During a step E1, the P-CSCF server 21 receives a session control message sent by the UE 10 and containing a media stream description compliant with the SDP (Session Description Protocol) protocol.

During a step E2, the P-CSCF server 21 sends a request for media stream reservation at the PCRF entity 30. This media stream reservation request is a Diameter resources control message "AAR" (for "AA-Request") such as is defined in IETF document RFC 4005.

During a step E3, the PCRF entity 30 sends to the P-CSCF server 21 a message of acknowledgment of the stream reservation request. This acknowledgment message is a Diameter resources control message "AAA" (for "AA-Answer") such as defined in document RFC 4005.

During a step E4, the PCRF entity 30 sends a message to the rules application entity PCEF 31 describing the rules to be installed in order to implement the media streams. This message describing the rules to be installed is a Diameter resources control message "RAR" (for "RA-Request") such as defined in document RFC 4005.

During a step E5, the PCEF entity 31 sends to the PCRF entity 30 a message of acknowledgment of installation of the rules. This acknowledgment message is a Diameter resources control message "RAA" (for "RA-Answer") such as defined in document RFC 4005.

Finally, during a step E6, the PCEF entity 31 implements said rules and authorizes the media streams.

According to one embodiment of the invention, during said step E2, the P-CSCF server sends, destined for the PCRF, through the interface Rx, a request in which the P-CSCF server asks to be notified of the state of the media controlled by this P-CSCF server and currently in use.

Accordingly, the P-CSCF server can for example, advantageously, apply the procedure indicated in Sections 4.4.6.4 and 5.3.13 of the aforementioned document TS 29.214, as well as in section B.1a of 3GPP document TS 29.213: this request for notification then takes the form of a Diameter message AAR setting an "Attribute-Value Pair" (AVP) field called "Specific-Action". More precisely, there is proposed to this effect a new value of the "Specific Action" AVP, which will be called "PERIODIC_MEDIA_STATE".

Moreover, in the absence of a default period, the P-CSCF server indicates to the PCRF a period on expiry of which it wishes to be notified of the state of the media which are currently in use. The periodicity of these notifications can be indicated in a dedicated AVP, which will be called "Media_State_Period". The period must be neither too short (so as not to needlessly overload the interface), nor too long (so as to allow effective "cleaning" of the orphan components). This "Media_State_Period" AVP can, likewise, be inserted by the P-CSCF into the resources request message AAR mentioned hereinabove; the P-CSCF thus indicates to the PCRF a time period on expiry of which the PCRF must send a message describing the current state of the media to the P-CSCF.

Preferably, the request for notification remains valid for the entire duration of the session; thus, it will not be necessary to renew it.

On expiry of the time period indicated in the "Media_State_Period" AVP, the PCRF sends the P-CSCF server a message in which it indicates the current state of the media controlled by this P-CSCF server and currently in use. Preferably, this message is an RAR Diameter message (Re-Auth-Request) comprising the value "PERIODIC_MEDIA_STATE", mentioned hereinabove, of the "Specific Action" AVP, so as to make the link with the "Specific Action" of the AAR at the origin of the present message RAR (from among, if relevant, other "Specific Actions" in progress) and thus to avoid risks of confusion. To describe the current state of the media, the PCRF may optionally use a grouped AVP "Flows" (that it is possible, conventionally, to insert into the RAR Diameter messages).

Subsequent to the receipt by the P-CSCF server of such an RAR Diameter message:
  either the media list provided by the PCRF is identical to that known to the P-CSCF server, and then the P-CSCF server does not undertake any action as a consequence,
  or a subset of the media of the list is different from those known, and then the P-CSCF server corrects its state of the media currently in use,
  or the set of the media of the list is unknown for this session, and then the P-CSCF server requests the release of the session by sending an STR ("Session Termination Request") Diameter message,
  or the session itself is unknown, and then the P-CSCF server requests its release (STR message).

Generally, the present invention can be implemented within the nodes of an IP network, for example rules control entities or application entities, by means of software components and/or hardware components.

The software components will be able to be integrated into a conventional computer program for network node management. This is why, as indicated hereinabove, the present invention also relates to a computerized system. This computerized system comprises in a conventional manner a central processing unit controlling through signals a memory, as well as an input unit and an output unit. Moreover, this computerized system can be used to execute a computer program comprising instructions for the implementation of any one of the methods of synchronization according to the invention.

Indeed, the invention also envisages a computer program downloadable from a communication network comprising instructions for the execution of the steps of a method of synchronization according to the invention, when it is executed on a computer. This computer program can be stored on a support readable by computer and can be executable by a microprocessor.

This program can use any programming language, and take the form of source code, object code, or of code intermediate between source code and object code, such as in a partially compiled form, or in any other desirable form.

The invention also envisages an irremovable, or partially or totally removable information support, readable by a computer and comprising instructions of a computer program such as is mentioned hereinabove.

The information support can be any entity or device capable of storing the program. For example, the support can comprise a storage means, such as a ROM, for example a CD ROM or a microelectronic circuit ROM, or a magnetic recording means, such as a hard disk, or else a USB key ("USB flash drive" in English).

Moreover, the information support can be a transmissible support such as an electrical or optical signal, which can be conveyed via an electrical or optical cable, by radio or by other means. The computer program according to the invention can be in particular downloaded over a network of Internet type.

As a variant, the information support can be an integrated circuit in which the program is incorporated, the circuit being adapted to execute or to be used in the execution of any one of the methods of synchronization according to the invention.

The invention claimed is:

1. A method of media state synchronization, the method comprising:
  sending a request from an application entity to a rules control entity, the request asking the rules control entity to send a message to the application entity describing the state of all the media reserved by the application entity at the rules control entity and which are controlled by this application entity and currently in use at a time period contained in the request, said time period indicating a period on expiry of which the application entity wishes to be notified by the rules control entity of said state of all said media,
  on expiry of said time period contained in the request, receiving from the rules control entity a message in which the rules control entity provides a media list as known by the rules control entity of all said media reserved by the application entity at the rules control entity, controlled by the application entity and currently in use at said time period contained in the request, said media list describing the current state of each of all said media, and
  subsequent to the receipt of the message, the application entity synchronizing the media list known to the application entity based on the media list provided by the rules control entity by:
    not undertaking any action if said media list provided by the rules control entity is identical to the media list known to the application entity,
    correcting the state of the media if only a subset of the media of the media list provided by the rules control entity is different from the media list known to the application entity, and
    requesting a release of a session if all of the media of the media list provided by the rules control entity is different from the media list known to the application entity for this session or if the session is unknown to the application entity.

2. The method of claim 1, wherein the request is presented by the application entity upon a request for media resources to the rules control entity.

3. The method of claim 2, wherein the request is inserted into a Specific-Action Attribute-Value Pair of an AA-Request Diameter message.

4. The method of claim 1, wherein exchanges between the application entity and the rules control entity comply with Diameter protocol.

5. The method of claim 4, wherein the message containing the state of the media is sent to the application entity by the rules control entity in an RA-Request Diameter message.

6. The method of claim 1, wherein the period is indicated in a dedicated Attribute-Value Pair (Media_State_Period) of an AA-Request Diameter message.

7. An application entity, the application entity comprising a processor and a memory, the processor configured to:
  send toward a rules control entity a request asking the rules control entity to send a message to the application entity describing the state of all the media reserved by the application entity at the rules control entity and which are controlled by this application entity and currently in use at a time period contained in the request, said time period indicating a period on expiry of which the application entity wishes to be notified by the rules control entity of said state of all said media,
  on expiry of said time period contained in the request, receive a message in which the rules control entity provides a media list as known by the rules control entity of all said media reserved by the application entity at the rules control entity, controlled by the application entity and currently in use at said time period contained in the request, said media list describing the current state of each of all said media, and subsequent to the receipt of the message, synchronize the media list known to the application entity based on the media list provided by the rules control entity by:

not undertaking any action if said media list provided by the rules control entity is identical to the media list known to the application entity, correcting the state of the media if only a subset of the media of the media list provided by the rules control entity is different from the media list known to the application entity, and requesting a release of a session if all of the media of the media list provided by the rules control entity is different from the media list known to the application entity for this session or if the session is unknown to the application entity.

8. The application entity of claim 7, the application entity further configured to implement Diameter protocol.

9. The application entity of claim 7, wherein the application entity is associated with a P-CSCF server in a Multimedia Subsystem IP network.

10. A rules control entity, the rules control entity comprising a processor and a memory, the processor configured to:

receive from an application entity a request asking the rules control entity to send a message to the application entity describing the state of all the media reserved by the application entity at the rules control entity and which are controlled by this application entity and currently in use at a time period contained in the request, said time period indicating a period on expiry of which the application entity wishes to be notified by the rules control entity of said state of all said media, and on expiry of said time period contained in the request, send toward the application entity a message in which the rules control entity provides a media list as known by the rules control entity of all said media reserved by the application entity at the rules control entity, controlled by the application entity and currently in use, said media list describing the current state of each of all said media, the sending of said message towards the application entity enabling the application entity to synchronize a media list known to the application entity based on the media list provided by the rules control entity by:

not undertaking any action if said media list provided by the rules control entity is identical to the media list known to the application entity, correcting the state of the media if only a subset of the media of the media list provided by the rules control entity is different from the media list known to the application entity, and requesting a release of a session if all of the media of the media list provided by the rules control entity is different from the media list known to the application entity for this session or if the session is unknown to the application entity.

11. The rules control entity of claim 10, wherein the rules control entity is further configured to implement Diameter protocol.

12. A communication system, comprising:

an application entity, the application entity comprising a processor and a memory, the processor of the application entity configured to:

send toward a rules control entity a request asking the rules control entity to send a message to the application entity describing the state of all the media reserved by the application entity at the rules control entity and which are controlled by this application entity and currently in use at a time period contained in the request, said time period indicating a period on expiry of which the application entity wishes to be notified by the rules control entity of said state of all said media, on expiry of said time period contained in the request, receive a message in which the rules control entity provides a media list as known by the rules control entity of all said media reserved by the application entity at the rules control entity, controlled by the application entity and currently in use at said time period contained in the request, said media list describing the current state of each of all said media, and subsequent to the receipt of the message, synchronize the media list known to the application entity based on the media list provided by the rules control entity by:

not undertaking any action if said media list provided by the rules control entity is identical to the media list known to the application entity, correcting the state of the media if only a subset of the media of the media list provided by the rules control entity is different from the media list known to the application entity, and requesting a release of a session if all of the media of the media list provided by the rules control entity is different from the media list known to the application entity for this session or if the session is unknown to the application entity, and said rules control entity, said rules control entity comprising a processor and a memory, the processor of the rules control entity configured to:

receive from the application entity the request asking the rules control entity to send the message to the application entity describing the state of all the media reserved by the application entity at the rules control entity and which are controlled by this application entity and currently in use at the time period contained in the request, said time period indicating the period on expiry of which the application entity wishes to be notified by the rules control entity of said state of all said media, and on expiry of said time period contained in the request, send toward the application entity the message in which the rules control entity provides a media list as known by the rules control entity of all said media reserved by the application entity at the rules control entity, controlled by the application entity and currently in use, said media list describing the current state of each of all said media.

13. A non-transitory computer-readable storage medium having stored thereon instructions, which when executed by a processor, cause the processor to implement the method of claim 1.

14. A computer comprising a processor and a memory, the memory having stored thereon instructions which, when executed by the processor, cause the computer to implement the method of claim 1.

* * * * *